United States Patent Office 2,733,566
Patented Feb. 7, 1956

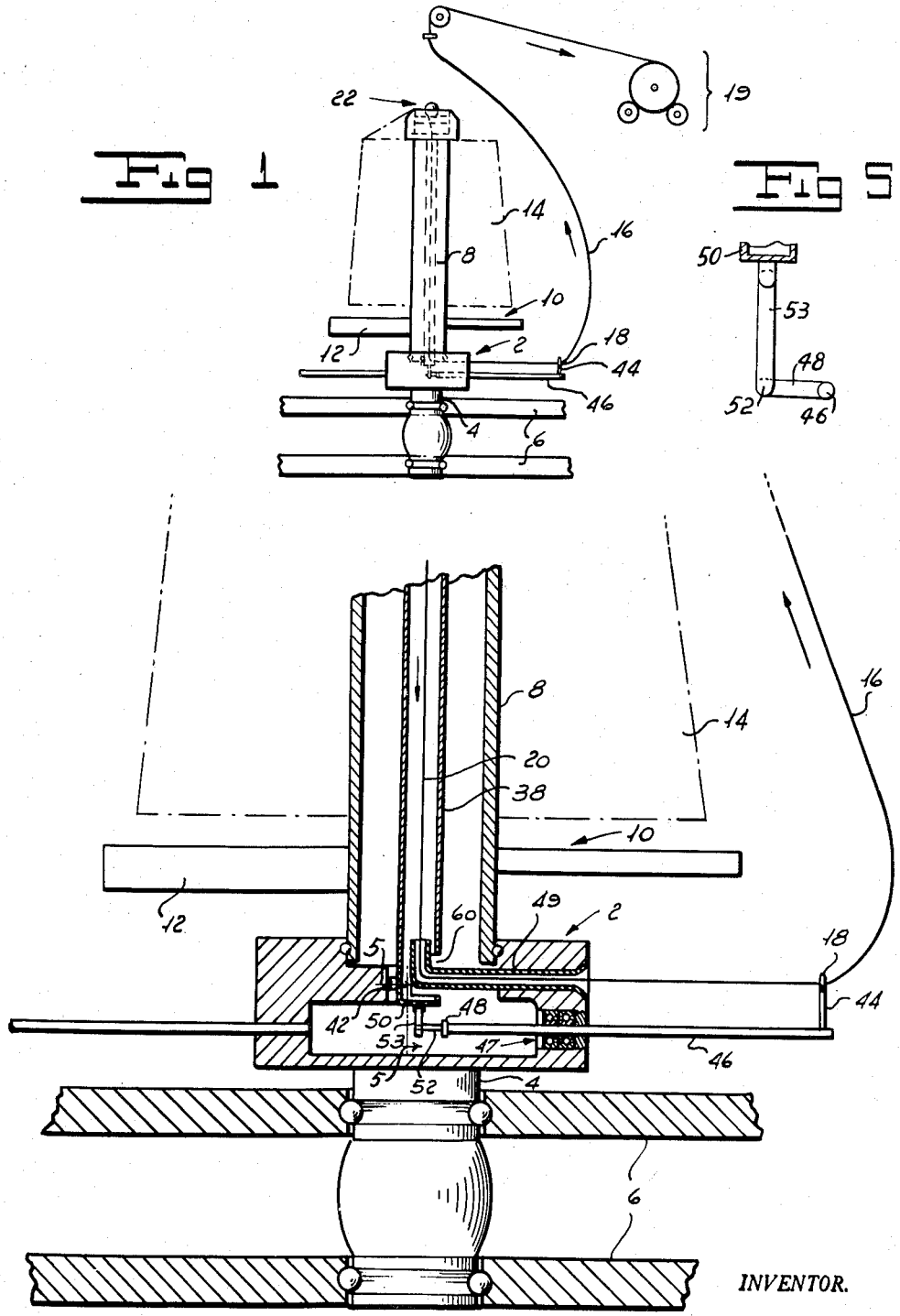

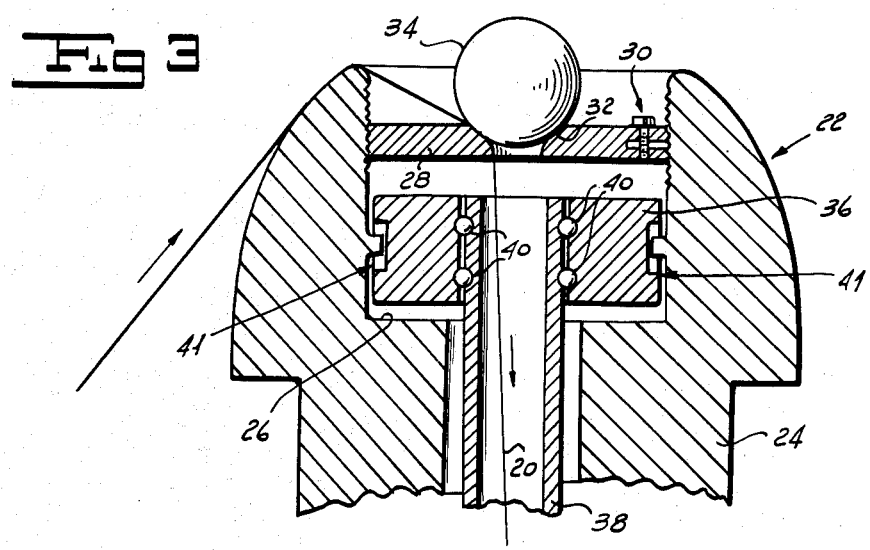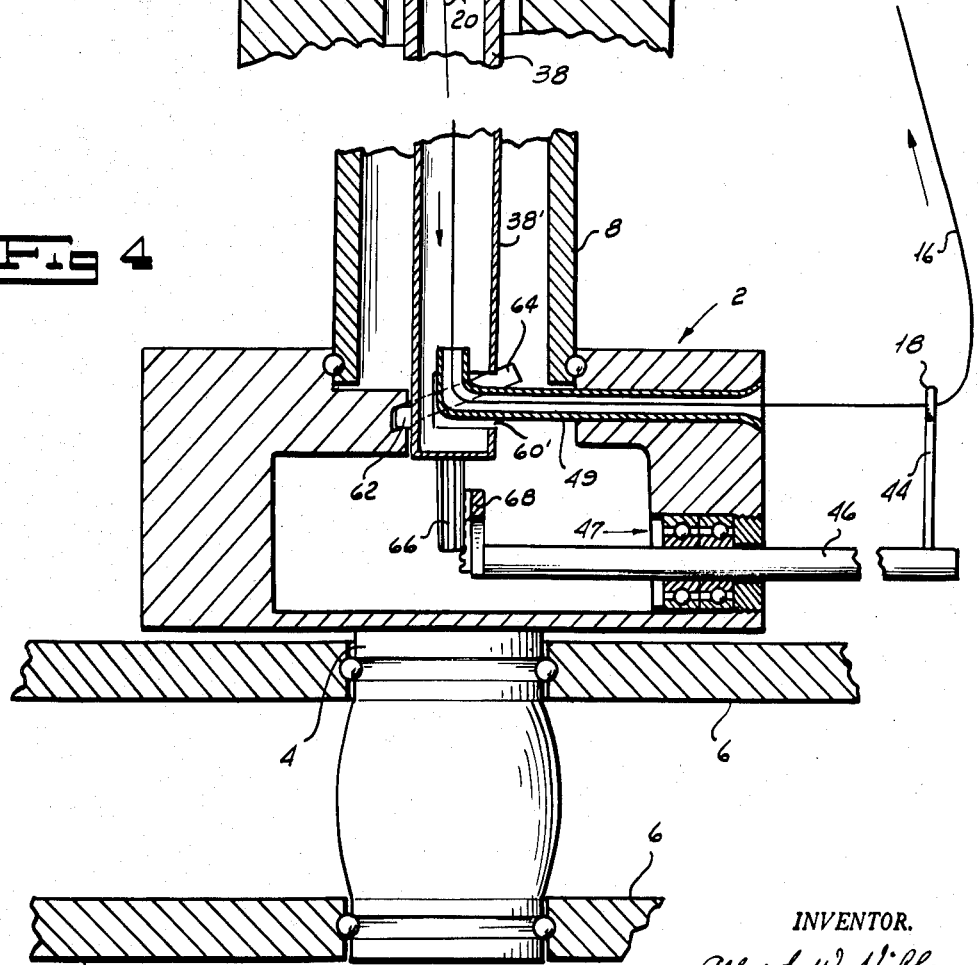

2,733,566

TWISTING SPINDLE BALLOON CONTROL

Alfred W. Vibber, Ridgewood, N. J.

Application April 10, 1953, Serial No. 347,943

12 Claims. (Cl. 57—58.86)

This invention relates to an improved spindle of the type which creates and maintains a free-flying loop or balloon of elongated flexible material at such spindle, the flyer of the spindle incorporating means for detecting or measuring changes in the shape and/or diameter of the baloon and for controlling such loop or balloon thereby, whereby the diameter of the loop or balloon is maintained within a predetermined desired range. The invention relates particularly to a spindle of the uptwister or supply two-for-one type wherein the back tension applying means is controlled by the means for detecting or measuring changes in the shape of the balloon.

This application is a continuation-in-part of application Serial No. 337,191, filed February 16, 1953, now Patent No. 2,726,506, bearing the same title as the instant application.

The present invention is particularly concerned with a spindle of the type indicated in which the flyer incorporates a balloon size and shape detecting or measuring means of the general type shown in Figs. 9 and 10 of application Serial No. 337,191. In such type of balloon shape detecting apparatus the balloon guiding eye on the outer end of the flyer is free to align itself substantially with the end of the balloon adjacent such eye, so that the eye affords a measure of the change in the angularity of the end of the balloon with respect thereto, such change in angularity bearing a fixed determinable relationship, under fixed conditions of flyer speed, yarn type, balloon height, and so forth, to the degree of wrap-around of the balloon at the spindle and thus to the diameter of the balloon, since under such conditions wrap-around and balloon diameter bear a fixed relationship to each other. Whereas in the illustrative embodiment in Figs. 9 and 10 of said prior application the oscillatory guiding eye is employed to control the speed of the take-up capstan of a downtwister, the control of the capstan being effected by an electrical linkage means, in the present invention such balloon shape detecting means controls the back tension imposing means of the supply spindle, and does so by a purely mechanical linkage between the detecting means and the tension imposing means.

The invention has among its objects the provision of a new and improved balloon diameter and/or shape controlling means for an elongated flexible material twisting spindle of the uptwister type.

The invention has as a further object the provision, in a spindle of the type indicated, of a novel, economical, and easily maintained linkage between the balloon diameter and/or shape detecting means and the back tension imposing means of the spindle.

Yet another object of the invention resides in the provision, in the indicated type of uptwister spindle, of a simple, positive, mechanical linkage between the balloon diameter and/or shape detecting means and the back tension imposing means of the spindle.

The above and further objects of the invention will be more readily apparent upon consideration of the accompanying drawing, forming a part of this specification, in which:

Fig. 1 is a somewhat diagrammatic view, generally in vertical axial section, through the first embodiment of the uptwister spindle of the invention;

Fig. 2 is an enlarged fragmentary view, generally in vertical axial section, through the flyer of the spindle of Fig. 1;

Fig. 3 is an enlarged fragmentary view, generally in vertical axial section, through the back tension imposing means of the spindle of Figs. 1 and 2;

Fig. 4 is an enlarged fragmentary view, likewise generally in vertical axial section, through the flyer of a second embodiment of the supply spindle of the invention; and Fig. 5 is a fragmentary enlarged view partially in elevation and partially in vertical section of the crank and linkage within the spindle, the section being taken along the line 5—5 in Fig. 2.

As will be evident from the above there are disclosed herein two embodiments of the spindle of the invention. Both of such embodiments incorporate balloon diameter and/or shape detecting means in the flyer thereof, such detecting means controlling the tension imposing means between the supply package and the flyer through an interposed linkage. The two embodiments differ in the character of such linkage employed.

The first embodiment of the spindle of the invention, shown in Figs. 1 and 2, has a flyer 2 supported on the rotatable shaft 4 journalled in the frame part 6. Shaft 4 is designed to be disposed at a small angle with respect to the vertical, although it is shown vertical in Figs. 1 and 2. The portion of the shaft between the frame parts is crowned to receive a driving belt (not shown). Rising from the top of the flyer, and journalled therein so as to remain non-rotatable with respect thereto, is the tube 8, on which is supported the eccentrically weighted platform 10 having the eccentric weight 12 thereon, tube 8 also serving as a means for supporting the yarn package 14. The outfeeding material in the balloon 16 is guided at its lower end by the eye 18, such eye being positioned on the generally vertical arm 44 affixed to the outer end of the radial arm 46. Arm 46 is rotatably mounted in the bearings 47 in the flyer 2. As is usual in uptwisters of this type, the yarn proceeding from the package 14 goes upwardly to the variable tension means 22, thence downwardly as vertical run 20, axially of the flyer, and into the curved guideway formed by tube 49 in the flyer 2 shown in Fig. 2. The yarn then proceeds outwardly of the flyer proper through the eye 18 and upwardly into the balloon 16. As set forth in application Serial No. 337,191, Figs. 9 and 10, the arm 44 and the eye 18 will tend to align themselves with the lower end of the balloon 16, the arm 46 turning about its axis to allow this. The degree of turning of the arm 44 in the direction toward the reader in Figs. 1 and 2, assuming that the eye 18 is travelling in the direction into the paper in such figures, is a measure of the degree of wrap-around of the balloon at the spindle, and thus a measure of the change in balloon diameter, since as balloon diameter increases the degree of wrap-around increases in a known determinable relationship, when the material is withdrawn from balloon 16 at a substantially constant speed, as by means 19 in Fig. 1.

The invention provides a novel simple mechanical linkage between the eye 18 and the variable tension means 22. When the swinging of the eye 18 and thus of the arm 44 supporting it about the axis of the radial arm 46 indicates that the balloon 16 has expanded unduly, the back tension imposing effect of the means 22 is increased. When the balloon 16 decreases in diameter, the back tension effect of means 22 is decreased. The linkage between the eye 18 and the tension means 22 is such that variation in the tension imposed by means 22 occurs smoothly as the arm 44 is pivoted from a vertical position to a position having a marked angle with respect thereto, as the balloon expands.

The tension means 22 has a main body 24 similar to that of the body of the back tension imposing means of Agresti et al. Patent No. 2,492,778. Body 24 has a well 26 coaxial thereof at the top, the upper portion of the side wall of the well being threaded. A ball seat member 28 is threadedly engaged in the top of the well, the member 28 being adjustable vertically of the well and being lockable therein by the means 30. A magnetic ball 34 is supported in a complementary seat 32 in the top of member 28. Ball 34 is pulled downwardly to a varying degree by the annular magnet 36 which fits within the bottom of the well and is adjustable vertically therein so as to vary the gap between it and the ball 34, thereby to vary the tensioning effect of means 22. The magnet 36 is rotatably supported by the bearings 40 on the top of the tube or shaft 38 which lies within tube 8 coaxial thereof, the yarn 20 proceeding downwardly from tension means 22 along the axis of the tube 38, as shown. Magnet 36 is splined to the side wall of the well 26 by the key means 41 so that it is reciprocable vertically but is held from rotation. The bottom end of the tube or shaft 38 is reciprocably mounted on the flyer 2, and is keyed for vertical movement therein by the means 42 consisting of a projecting lug on the exterior of tube 38 fitting within a vertical guideway in the flyer. The side of tube 38 is provided with a slot 60 receiving the curved material guiding tube 49 in the flyer so that the tube 38 has appreciable freedom of vertical movement. Oscillation of arm 46 causes axial movement of tube 38 by an eccentric connecting means, to be described.

Within the flyer 2 the inner end of the arm 46 thereof is provided with an offset 48 extending inwardly of the paper normal thereto when arm 44 is vertical, as shown in Fig. 2, and a radially projecting arm 52 thereon, so as to form a crank. Pin 52 is connected to the terminal fixture 50 on the bottom of tube 38 by the link 53. With the proper size and correlation of parts, when arm 44 lies vertical the magnet 36 will lie in a terminal position near the bottom of the well 26 as shown in Fig. 3. In such position a large air gap exists between the magnet and the ball 34. As the arm 44 supporting eye 18 is tipped toward the reader (Figs. 1 and 2), assuming that the eye 18 is travelling in the described direction away from the reader in such figures, magnet 36 will be progressively raised by crank 48 and supporting tube 38, whereby to decrease the gap between the magnet and the ball and to increase the back tension imposed on the yarn by the means 22. During operation of the spindle, with the balloon diameter lying anywhere within the operative range thereof, the arm 44 will be tipped appreciably from the vertical in the direction opposite its instantaneous direction of travel about the axis of the spindle. Accordingly, the device of Figs. 1–3, inclusive, will function automatically to keep the balloon 16 within predetermined limits of balloon diameter, since the increased back tension imposed by means 22 on the yarn will decrease the speed of feeding of material into the balloon, when the balloon has expanded unduly. The converse holds true when the balloon contracts unduly, that is, the means 22 then imposes less back tension on the material to increase the speed of its feeding into the balloon.

In Fig. 4 there is shown an alternative embodiment of the balloon control means of the above described structure. Parts in Fig. 4 similar to those in Figs. 1–3, inclusive, are designated by the same reference characters. In this embodiment the vertical tube 38' has a slot 60' therein extending around the tube 49 throughout, for example, 240°, such slot receiving the inner end of the curved yarn guiding tube in the flyer 2. Oscillation of the flyer arm 46 by the arm 18, in this instance, rotates the tube 38' with respect to the flyer and, by a cam connection consisting of a projection 62 on the bottom of tube 38' and fitting within a partial helical cam track 64 in the flyer, causes vertical reciprocation of the tube 38'. Connected to the top of tube 38' is the tension means 22, which is the same as that shown in Fig. 3.

The inner end of the arm 46 is provided with a large ring gear 68, such ring gear meshing with the elongated small pinion 66 located coaxial of tube 38' and connected to the bottom end thereof. Oscillation of the arm 44 causes turning of the tube 38' and its rising and falling depending on the direction of oscillation of arm 44. Such rising and falling of the tube 38', as before, causes variation in the gap between the magnet 36 and the ball 34, thereby to vary the tension imposed on the yarn. The configuration of the cam track 64 is such that when the arm 44 lies vertical, the magnet 36 lies near the bottom of well 26, and that when the arm 44 is moved substantially toward the reader in Fig. 4, the magnet 36 will have approached the bottom of the ball seat providing member 28 in means 22.

The balloon shape and/or diameter detecting or sensing means and the linkage connecting such sensing means with the variable back tension imposing means in both the described embodiments are simple to make and to maintain. Such control means is entirely mechanical in nature, making the spindle self-contained and substantially free from maintenance problems.

Although for purposes of illustration I have shown various embodiments of the apparatus for controlling the variable back tension imposing means of an uptwister type of spindle, in response to balloon diameter and/or shape detecting or measuring means incorporated in the flyer, it is to be understood that such embodiments are illustrative only and that the invention is to be defined by the scope of the claims appended hereto.

Thus, other variable tension-imposing means may be substituted for the magnetic ball means 22 employed in the illustrative embodiments of the apparatus. Also, other balloon diameter and/or shape detecting or measuring means, such as those in the illustrative embodiments in application Serial No. 337,191 other than that of Figs. 9 and 10 therein may be employed in the flyer of the spindle of the present invention. In addition to such variations within the scope of the present invention, other linkages between the balloon diameter and/or shape detecting means in the flyer and the variable tension imposing means may be used. Such linkage employed in Figs. 1–3, inclusive, causes the magnet 36 to rise at an increasingly lower rate with increasing deflection of arm 44 from the vertical, because of the inherent geometry of the crank arm 52. The linkage employed in Fig. 4 produces straight line variation of magnet height vs. deflection of arm 44. Thus with the linkage of Fig. 4 the back tension-imposing effect of means 22 increases much more rapidly with increase in diameter of the balloon than it does with the linkage of Figs. 1, 2, and 3. As indicated, other linkages may be used; such other linkages may, if desired, provide other relationships between (1) the distance from the magnetic ball to the magnet and (2) the angular deflection of the arm 44, whereby balloon 16 may be stably held within a desired operating range.

I claim as new the following:

1. A supply twisting spindle comprising a flyer for creating and maintaining a free-flying rotating loop of the material, means for rotating the flyer, means for supporting a package of material on the spindle, a variable tension-applying means engaging the material between the package and the outer end of the flyer, guide means on the flyer adjacent the outer end thereof for engaging the material as it passes along the flyer, means mounting the guide means for movement with respect to the flyer in an arc about an axis radial of the flyer whereby the guide means may align itself with the end of the loop passing therethrough, and means operative in response to swinging of the guide to adjust the tension-applying means.

2. A supply twisting spindle comprising a rotatable flyer for creating and maintaining a free-flying rotating loop of the material, means for supporting a package of material on the spindle, a variable tension-applying means engaging the material between the package and the outer end of the flyer, guide means on the flyer for engaging the material as it passes into the loop, means mounting the guide means for movement with respect to the flyer by the end of the loop passing therethrough, and means operative in response to movement of the guide to adjust the tension-applying means.

3. A two-for-one supply twisting spindle comprising a flyer for creating and maintaining a free-flying rotating loop of the material, means for rotating the flyer, means for supporting a package of material on the spindle, a variable tension-applying means engaging the material between the package and the outer end of the flyer, guide means on the flyer adjacent the outer end thereof for engaging the material as it passes along the flyer, means mounting the guide means for movement with respect to the flyer in an arc about an axis radial of the flyer whereby the guide means may align itself with the end of the loop passing therethrough, and means operative in response to swinging of the guide to adjust the tension-applying means.

4. A supply twisting spindle for twisting elongated flexible material comprising a rotatable flyer for creating and maintaining a free-flying rotating loop of the material, means for supporting a package of material on the spindle, a variable tension-applying means engaging the material between the package and the outer end of the flyer, guide means on the flyer adjacent the outer end thereof for engaging the material as it passes along the flyer, means mounting the guide means for movement with respect to the flyer by the end of the loop passing therethrough, and a linkage connected to the guide means and to the tension-applying means and operative in response to such movement of the guide to adjust the tension-applying means.

5. A supply twisting spindle for twisting elongated flexible material comprising a rotatable flyer for creating and maintaining a free-flying rotating loop of the material, means for supporting a package of material on the spindle, a variable tension-applying means engaging the material between the package and the outer end of the flyer, guide means on the flyer adjacent the outer end thereof for engaging the material as it passes along the flyer, means mounting the guide means for movement with respect to the flyer in an arc about an axis radial of the flyer whereby the guide means may align itself with the end of the loop passed therethrough, and a mechanical linkage connected to the guide means and to the tension-applying means and operative in response to swinging of the guide to adjust the tension-applying means.

6. A two-for-one supply twisting spindle for twisting elongated flexible material comprising a flyer for creating and maintaining a free-flying rotating loop of the material, means for rotating the flyer, means for supporting a package of material on the spindle, a variable tension-applying means engaging the material above the package and the flyer, a loop guiding eye on the flyer adjacent the outer end thereof for engaging the material as it passes along the flyer, means mounting the eye for movement with respect to the flyer in an arc about an axis radial of the flyer whereby the eye may align itself with the end of the loop passing therethrough, and means operative in response to swinging of the eye to adjust the tension-applying means.

7. A two-for-one supply twisting spindle for twisting elongated flexible material comprising a flyer for creating and maintaining a free-flying rotating loop of the material, means for rotating the flyer, a tube supported on the spindle, rising above the flyer, and substantially fixedly held in space, means for supporting a package of material on the tube, a variable tension-applying means supported on the tube and engaging the material above the package and the flyer, a loop guiding eye on the flyer adjacent the outer end thereof for engaging the material as it passes along the flyer, means mounting the eye for movement with respect to the flyer in an arc about an axis radial of the flyer whereby the eye may align itself with the end of the loop passing therethrough, and means operative in response to swinging of the eye to adjust the tension-applying means.

8. Apparatus for handling elongated flexible material comprising a flyer for creating and maintaining a free-flying rotating loop of the material, means for rotating the flyer, means for supporting a package of material on the spindle, a variable tension-applying means engaging the material above the flyer and the package, a radially projecting, first arm mounted for oscillation on the flyer, a second arm connected to the outer end of the first arm, said second arm in one operative position projecting generally normal to the plane of rotation of the flyer, a loop guiding eye mounted on the outer end of the second arm for engaging the material as it passes along the flyer, the means mounting the eye allowing the movement of the latter with respect to the flyer about an axis radial of the flyer whereby the eye may align itself with the end of the loop passing therethrough, an elongated tension means varying member mounted between the flyer and the tension-applying means, and means connecting the inner end of the first arm on the flyer with such elongated member so that the elongated member is moved in response to swinging of the eye to adjust the tension-applying means.

9. A two-for-one supply twisting spindle for elongated flexible material comprising a flyer for creating and maintaining a free-flying rotating loop of the material, means for rotating the flyer, means for supporting a package of material on the spindle, a variable tension-applying means engaging the material above the flyer and the package, a radially projecting, first, arm mounted for oscillation on the flyer, a second arm connected to the outer end of the first arm, said second arm in one operative position projecting generally normal to the plane of rotation of the flyer, a loop guiding eye mounted on the outer end of the second arm for engaging the material as it passes along the flyer, the means mounting the eye allowing the movement of the latter with respect to the flyer in an arc about an axis radial of the flyer whereby the eye may align itself with the end of the loop passing therethrough, a tubular tension means varying member mounted coaxial of the flyer between it and the tension-applying means, and eccentric means connecting the inner end of the first arm on the flyer with such tubular member so that the tubular member is reciprocated in response to oscillation of the eye to adjust the tension-applying means.

10. A two-for-one supply twisting spindle for elongated flexible material comprising a flyer for creating and maintaining a free-flying rotating loop of the material, means for rotating the flyer, means for supporting a package of material on the spindle, a variable tension-applying means engaging the material above the flyer and the package, a radially projecting, first, arm mounted for oscillation on the flyer, a second arm connected to the outer end of the first arm, said second arm in one operative position projecting generally normal to the plane of rotation of the flyer, a loop guiding eye mounted on the outer end of the second arm for engaging the material as it passes along the flyer, the means mounting the eye allowing the movement of the latter with respect to the flyer in an arc about an axis radial of the flyer whereby the eye may align itself with the end of the loop passing therethrough, an oscillatable tubular tension means varying member mounted coaxial of the flyer between it and the tension-applying means, and rotation transmitting means connecting the inner end of the first arm on the flyer with such tubular member so that the tubular member is turned in response to swinging of the eye to adjust the tension-applying means.

11. A spindle for treating elongated flexible material, said spindle comprising a balloon creating and maintaining rotatable main, first, shaft, balloon shape detecting means on the shaft movable with respect to the main shaft upon changes in the shape of the balloon, a reciprocable, second, shaft positioned on the main shaft parallel to the axis thereof, and means connecting the balloon shape detecting means to the second shaft to cause the second shaft to travel parallel to the axis of the main shaft and relative to the main shaft upon a change in shape of the balloon.

12. A spindle for treating elongated flexible material, said spindle comprising a balloon creating and maintaining rotatable main, first, shaft, balloon shape detecting means on the shaft movable with respect to the main shaft upon changes in the shape of the balloon, a reciprocable, second, shaft positioned on the main shaft parallel to the axis thereof, said reciprocable shaft extending inwardly of the balloon at the spindle, and means connecting the balloon shape detecting means to the second shaft to cause the second shaft to travel parallel to the axis of the main shaft and relative to the main shaft upon a change in shape of the balloon.

References Cited in the file of this patent

UNITED STATES PATENTS

| 2,127,921 | Kent | Aug. 23, 1938 |
| 2,492,778 | Agresti et al. | Dec. 27, 1949 |
| 2,550,136 | Clarkson | Apr. 24, 1951 |

FOREIGN PATENTS

| 570,346 | Germany | Feb. 15, 1933 |